United States Patent
Jung et al.

(10) Patent No.: US 11,949,057 B2
(45) Date of Patent: Apr. 2, 2024

(54) APPARATUS FOR MANUFACTURING ELECTRODE ASSEMBLY CONTROLLING TENSION OF SEPARATOR BY ADJUSTING HEIGHT OF WINDING ROLL, ELECTRODE ASSEMBLY MANUFACTURED THERETHROUGH, AND SECONDARY BATTERY

(71) Applicant: LG ENERGY SOLUTION, LTD., Seoul (KR)

(72) Inventors: Hyun Chul Jung, Daejeon (KR); Ki Woong Kim, Daejeon (KR); Hyun Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 435 days.

(21) Appl. No.: 17/414,093

(22) PCT Filed: Jan. 15, 2020

(86) PCT No.: PCT/KR2020/000733
§ 371 (c)(1),
(2) Date: Jun. 15, 2021

(87) PCT Pub. No.: WO2020/149638
PCT Pub. Date: Jul. 23, 2020

(65) Prior Publication Data
US 2022/0069332 A1    Mar. 3, 2022

(30) Foreign Application Priority Data
Jan. 17, 2019 (KR) .................. 10-2019-0006172

(51) Int. Cl.
*H01M 10/04* (2006.01)
*B65H 23/04* (2006.01)
(Continued)

(52) U.S. Cl.
CPC ...... *H01M 10/0404* (2013.01); *B65H 23/044* (2013.01); *B65H 23/1825* (2013.01);
(Continued)

(58) Field of Classification Search
CPC ......... H01M 10/0404; H01M 10/0459; H01M 10/0525; H01M 10/0585; B65H 23/044; B65H 23/1825
(Continued)

(56) References Cited

U.S. PATENT DOCUMENTS

| 2010/0132308 A1 | 6/2010 | Kadowaki et al. |
| 2012/0208066 A1 | 8/2012 | Schaefer et al. |

(Continued)

FOREIGN PATENT DOCUMENTS

| CN | 101663780 A | 3/2010 |
| CN | 102576896 A | 7/2012 |

(Continued)

OTHER PUBLICATIONS

International Search Report (PCT/ISA/210) issued in PCT/KR2020/000733 dated Apr. 23, 2020.

*Primary Examiner* — Sean P Cullen
(74) *Attorney, Agent, or Firm* — Birch, Stewart, Kolasch & Birch, LLP

(57) ABSTRACT

An apparatus for manufacturing the electrode assembly, in which an electrode and a separator are alternately stacked on a stack table, and the separator is folded in a zigzag shape so that the electrode is disposed between the folded separators to manufacture the electrode assembly, has a separator supplier configured to supply the separator to the stack table, and a separator tension adjuster configured to constantly adjust tension of the separator supplied to the stack table. The separator supplier comprises a separator winding roll around which the separator is wound, and the separator tension adjuster adjusts a supply height of the separator winding roll to adjust the tension of the separator.

12 Claims, 9 Drawing Sheets

(51) Int. Cl.
*B65H 23/182* (2006.01)
*H01M 10/0525* (2010.01)
*H01M 10/0585* (2010.01)

(52) U.S. Cl.
CPC ... *H01M 10/0459* (2013.01); *H01M 10/0525* (2013.01); *H01M 10/0585* (2013.01); *B65H 2301/413526* (2013.01); *B65H 2403/52* (2013.01); *B65H 2553/80* (2013.01); *B65H 2701/19* (2013.01)

(58) Field of Classification Search
USPC .............................. 29/730, 623.3; 429/162
See application file for complete search history.

(56) References Cited

U.S. PATENT DOCUMENTS

| | | |
|---|---|---|
| 2014/0050958 A1 | 2/2014 | Kwon et al. |
| 2014/0237808 A1* | 8/2014 | Nakakuki ......... H01M 10/0459 29/730 |
| 2020/0185754 A1 | 6/2020 | Lee et al. |
| 2020/0243893 A1 | 7/2020 | Lee et al. |
| 2020/0243894 A1 | 7/2020 | Lee et al. |

FOREIGN PATENT DOCUMENTS

| | | |
|---|---|---|
| CN | 108163603 A | 6/2018 |
| EP | 3 573 166 A1 | 11/2019 |
| JP | WO2008/139561 A1 | 7/2010 |
| JP | 6432021 B2 | 12/2018 |
| KR | 10-2012-0023367 A | 3/2012 |
| KR | 10-2012-0055650 A | 5/2012 |
| KR | 10-1320895 B1 | 10/2013 |
| KR | 10-2013-0132230 A | 12/2013 |
| KR | 10-2014-0015994 A | 2/2014 |
| KR | 10-2017-0112895 A | 10/2017 |
| KR | 10-2017-0114904 A | 10/2017 |
| KR | 10-1806939 B1 | 12/2017 |
| KR | 10-2018-0013640 A | 2/2018 |
| KR | 10-2018-0060680 A | 6/2018 |
| KR | 10-1906983 B1 | 10/2018 |
| WO | WO 2008/139561 A1 | 11/2008 |

* cited by examiner

APPARATUS FOR MANUFACTURING ELECTRODE ASSEMBLY CONTROLLING TENSION OF SEPARATOR BY ADJUSTING HEIGHT OF WINDING ROLL, ELECTRODE ASSEMBLY MANUFACTURED THERETHROUGH, AND SECONDARY BATTERY

CROSS-REFERENCE TO RELATED APPLICATION

The present application claims the benefit of the priority of Korean Patent Application No. 10-2019-0006172, filed on Jan. 17, 2019, which is hereby incorporated by reference in its entirety.

TECHNICAL FIELD

The present invention relates to an apparatus for manufacturing an electrode assembly, an electrode manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack & folding type electrode assembly in which stacked type unit cells are wound together with a separation film having a long length.

Here, in the stack & folding type electrode assembly, when the separator is folded in a zigzag shape, there is a problem that the separator affects dispersion of air permeability and wetting property because the tension of the separator is different according to positions therein.

In more detail, when the separator is folded left and right while stacking the electrode between the folded separators, the tension applied to the separators is not non-uniform to cause wrinkles in the separators. Thus, the electrodes and the separators are unevenly stacked, resulting in high dispersion of the air permeability and wetting property of the electrode assembly. As a result, since the dispersion of the wetting property and air permeability is high, there is a problem that performance of the secondary battery that is charged and discharged while lithium ions move between the electrode and the separator is significantly deteriorated.

[Prior Art Document] Korean Patent Publication No. 10-2013-0132230

DISCLOSURE OF THE INVENTION

Technical Problem

One aspect of the present invention is to provide an apparatus for manufacturing an electrode assembly, which is capable of maintaining a constant tension of a separator to be folded when the separator is folded in a zigzag shape to manufacture the electrode assembly, an electrode assembly manufactured therethrough, and a secondary battery.

Technical Solution

The apparatus for manufacturing the electrode assembly, in which an electrode and a separator are alternately stacked on a stack table, and the separator is folded in a zigzag shape so that the electrode is disposed between the folded separators to manufacture the electrode assembly, according to an embodiment of the present invention comprises a separator supply unit configured to supply the separator to the stack table, and a separator tension adjustment unit configured to constantly adjust tension of the separator supplied to the stack table, wherein the separator supply unit comprises a separator winding roll around which the separator is wound, and the separator tension adjustment unit adjusts a supply height of the separator winding roll to adjust the tension of the separator.

Advantageous Effects

According to the present invention, when the separator is folded in the zigzag shape, and the electrode is disposed between the folded separators to manufacture the electrode assembly, the tension of the separators may be constantly adjusted through the separator tension adjustment unit, thereby preventing the zigzag-folded separator from being wrinkled. As a result, the electrode and the separator may be uniformly stacked to reduce the dispersion of the wetting property and air permeability of the electrode assembly.

In addition, according to the present invention, the tension of the separator may be measured through the tension meter, and the measured tension value may be reflected to the control unit to constantly maintain the tension of the separator through the separator tension adjustment unit. Therefore, the electrode and the separator may be more uniformly stacked to significantly reduce the dispersion of the wetting property and air permeability of the electrode assembly, thereby significantly improving the performance of the secondary battery comprising the electrode assembly.

MODE FOR CARRYING OUT THE INVENTION

Figure 1:
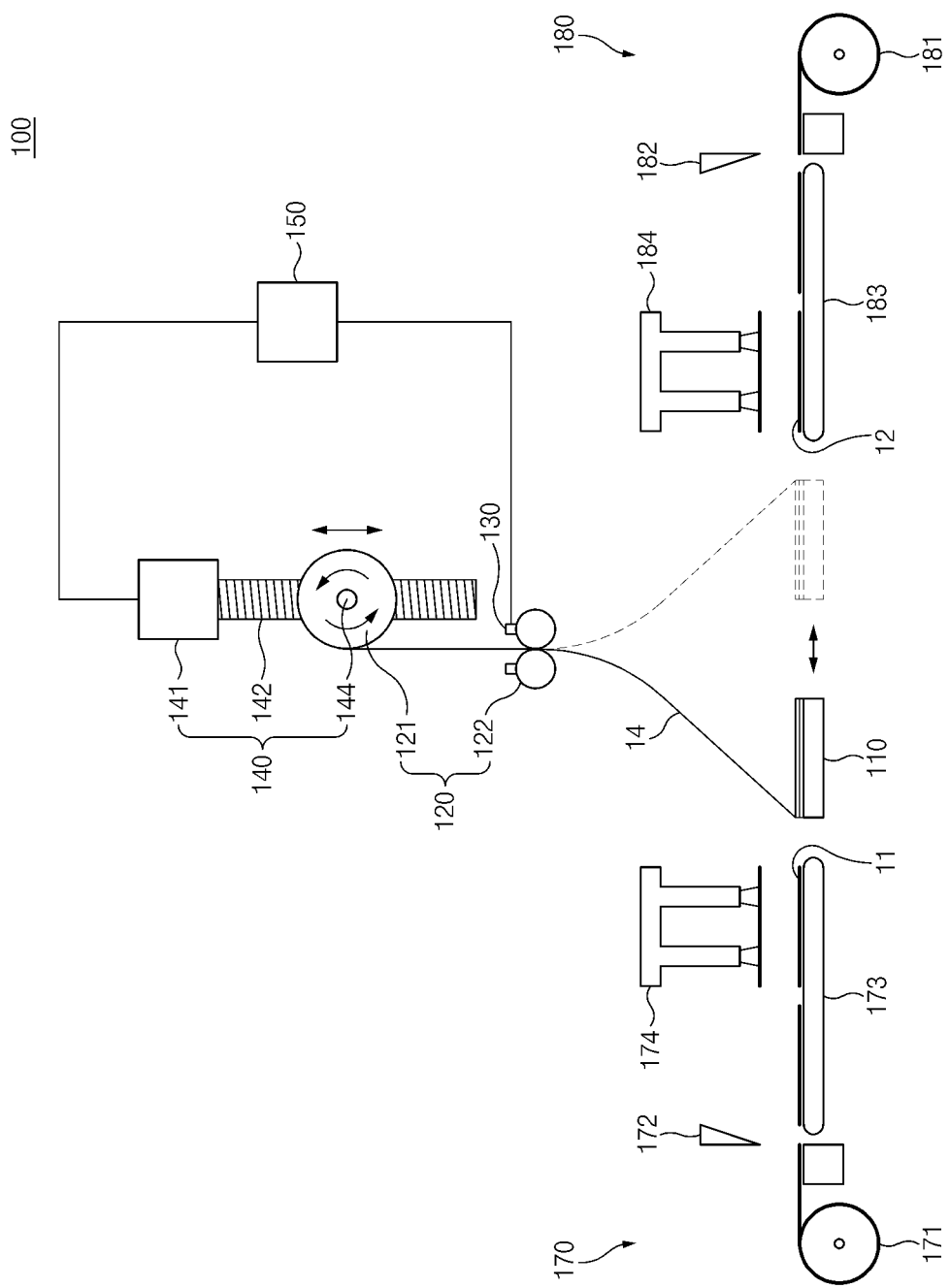
FIG. 1 is a front view exemplarily illustrating an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
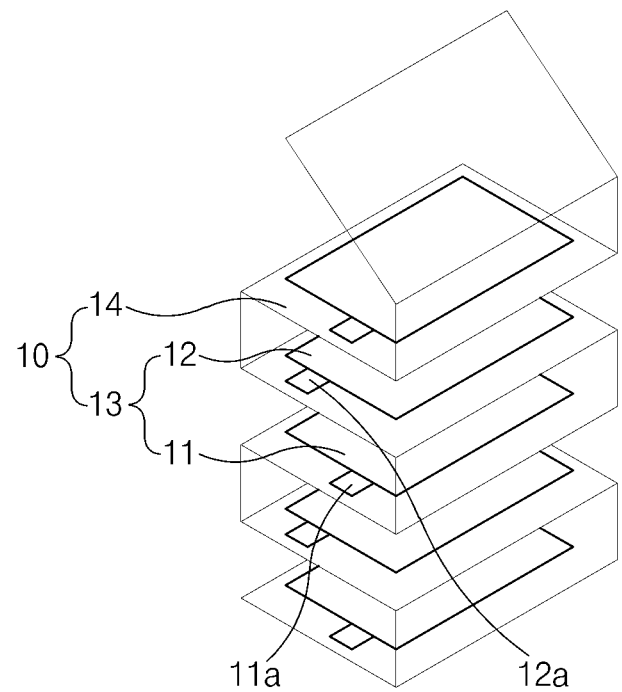
FIG. 2 is a conceptual perspective view of the electrode assembly in the apparatus for manufacturing the electrode assembly according to an embodiment of the present invention.

FIG. 1 is a front view exemplarily illustrating an apparatus for manufacturing an electrode assembly according to an embodiment of the present invention, and FIG. 2 is a conceptual perspective view of the electrode assembly in the apparatus for manufacturing the electrode assembly according to an embodiment of the present invention.

Referring to FIGS. 1 and 2, an apparatus 100 for manufacturing an electrode assembly according to an embodiment of the present invention is an apparatus for manufacturing an electrode assembly 10 by alternately stacking an electrode 13 and a separator 14 on a stack table 110 and comprises a separator supply unit 120 supplying the separator 14 to the stack table 110 and a separator tension adjustment unit 140 constantly adjusting tension of the separator 14 supplied to the stack table 110. Also, the apparatus 100 for manufacturing the electrode assembly according to an embodiment of the present invention may further comprise a tension meter 130 measuring the tension of the separator 14, a control unit controlling the separator tension adjustment unit 140, and a fixing jig fixing the electrode 13 and the separator 14 to the stack table 110.

Figure 3:
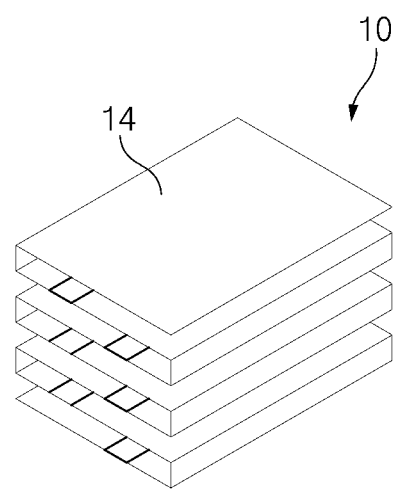
FIG. 3 is a perspective view illustrating a state in which the electrode assembly is stacked in the apparatus for manufacturing the electrode assembly according to an embodiment of the present invention.

FIG. 3 is a perspective view illustrating a state in which the electrode assembly is stacked in the apparatus for manufacturing the electrode assembly according to an embodiment of the present invention.

Hereinafter, the apparatus for manufacturing the electrode assembly according to an embodiment of the present invention will be described in more detail with reference to FIGS. 1 to 6.

Referring to FIGS. 1 and 2, the apparatus 100 for manufacturing the electrode assembly according to an embodiment of the present invention is an apparatus in which the electrode 13 and the separator 14 are alternately stacked on the stack table 110, and the separator 14 is folded in a zigzag shape to allow the electrode 13 to be disposed between the folded separators 14, thereby manufacturing the electrode assembly 10.

Here, the electrode 13 may comprise a first electrode and a second electrode 12. The apparatus 100 for manufacturing the electrode assembly may manufacture the electrode assembly 10 by stacking the first electrode 11, the separator 14, and the second electrode 12.

Referring to FIGS. 2 and 3, the electrode assembly may be a power generation element that is chargeable/dischargeable and have a shape in which the first electrode 11, the separator 14, and the second electrode 12 are alternately stacked to be combined with each other. Here, the electrode assembly may have, for example, a shape in which the separator 14 is folded in the zigzag shape, and the first electrode 11 and the second electrode 12 are alternately disposed between the folded separators 14.

The first electrode 11 may be provided with a first electrode tab 11a, and the second electrode 12 may be provided with a second electrode tab 12a.

Although the first electrode 11 is provided as a positive electrode, and the second electrode 12 is provided as a negative electrode, the present invention are not limited thereto. For example, the first electrode 11 may be provided as a negative electrode, and the second electrode 12 may be provided as a positive electrode.

The positive electrode may comprise a positive electrode collector (not shown) and a positive electrode active material (not shown) applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector (not shown) and a negative electrode active material (not shown) applied to the negative electrode collector. For example, the negative electrode collector may be provided as foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

Also, the separator 14 may be made of an insulating material and a flexible material. Here, the separator 14 may be made of, for example, a polyolefin-based resin film such as polyethylene or polypropylene having micropores.

Referring to FIGS. 1 and 2, the first electrode 11, the separator 14, and the second electrode 12 may be stacked on the stack table 110 in the shape in which the first electrode 11 and the second electrode 12 are alternately disposed between the folded separators 14.

Also, referring to FIG. 1, the stack table 110 may move in left and right directions to fold the separator 14 in the zigzag shape.

Figure 4:
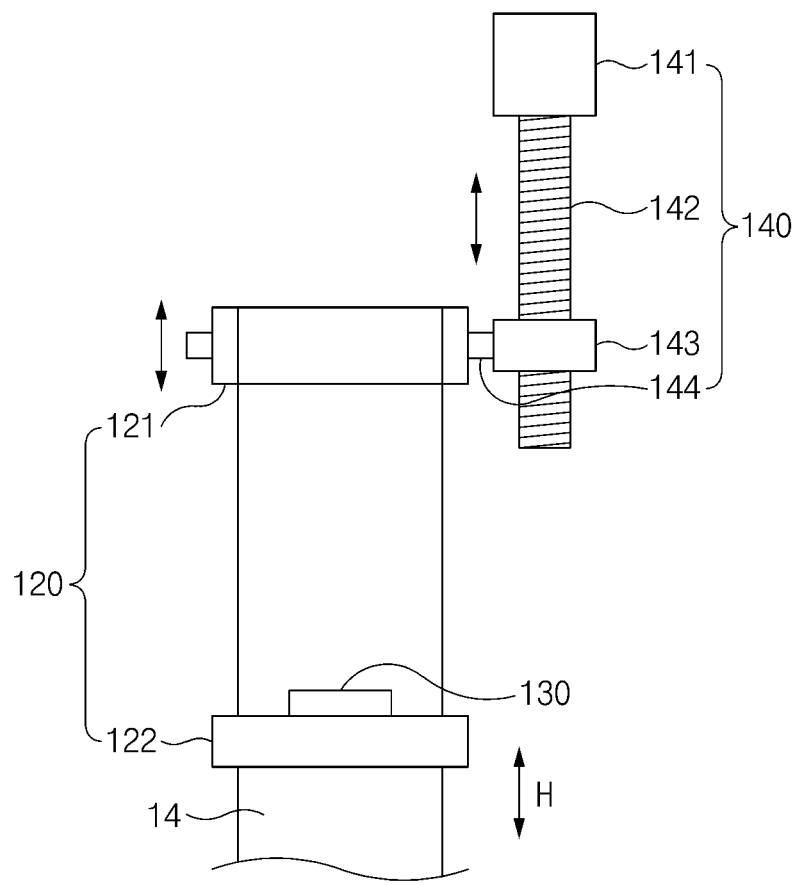
FIG. 4 is a side view exemplarily illustrating a main part of the apparatus for manufacturing the electrode assembly according to an embodiment of the present invention.

FIG. 4 is a side view exemplarily illustrating a main part of the apparatus for manufacturing the electrode assembly according to an embodiment of the present invention, FIG.

Figure 6:
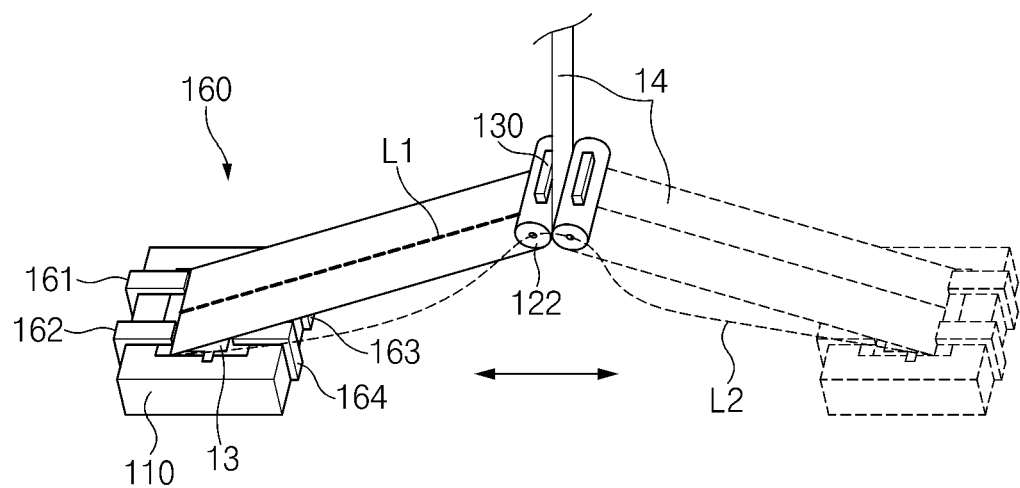
FIG. 6 is a conceptual perspective view illustrating a state in which a separator is zigzag-folded on a stack table in the apparatus for manufacturing the electrode assembly according to an embodiment of the present invention.

5 is a cross-sectional view of a screw rod and a nut block in the apparatus for manufacturing the electrode assembly according to an embodiment of the present invention, and FIG. 6 is a conceptual perspective view illustrating a state in which a separator is zigzag-folded on a stack table in the apparatus for manufacturing the electrode assembly according to an embodiment of the present invention.

Referring to FIG. 1, the separator supply unit 120 may supply the separator 14 to the stack table 110.

The separator supply unit may comprise a separator winding roll 121 around which the separator 14 is wound. Also, the separator supply unit 120 may further comprise a support roll 122 that supports the separator 14 unwound from the separator winding roll 121 to move to the stack table 110.

The support roll 122 may be provided in a pair to support both surfaces of the separator 14. Here, the pair of support rolls 122 may be disposed side by side in the left and right directions and be spaced a predetermined distance upward from the stack table 110.

Referring to FIGS. 1 and 4, the separator tension adjustment unit 140 may constantly adjust the tension of the separator 14 supplied to the stack table 110. Here, the separator tension adjustment unit 140 may adjust a supply height of the separator winding roll 121 to adjust the tension of the separator 14.

Also, the separator tension adjustment unit 140 may comprise a support shaft 144, on which the separator winding roll 121 is mounted, and may allow the support shaft 144 to move, thereby adjusting the tension of the separator 14.

Figure 5:
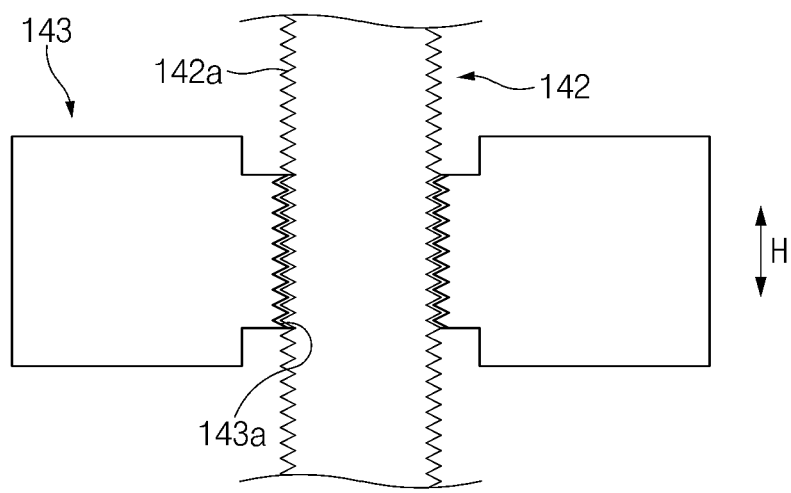
FIG. 5 is a cross-sectional view of a screw rod and a nut block in the apparatus for manufacturing the electrode assembly according to an embodiment of the present invention.

Furthermore, referring to FIGS. 4 and 5, the separator tension adjustment unit 140 may further comprise a nut block having one side, on which the support shaft 144 is mounded, and having an inner circumferential surface, in which a screw hole 143a is formed, a screw rod 142 having an outer circumferential surface on which a screw part 142a is formed to be screw-coupled to the screw hole 143a of the nut block 143, and a motor allowing the screw rod 142 to rotate.

The motor 141 may be provided as, for example, a servo motor or a step motor.

Here, referring to FIGS. 1 and 4, when the separator tension adjustment unit 140 allows the motor 141 to rotate, for example, in one direction, the nut block 143 may move downward along the screw rod 142. Here, the support shaft 144 mounted on the nut block 143 may move downward, and the separator winding roll 121 mounted on the support shaft 144 may move downward to decrease in supply height.

When the separator tension adjustment unit 140 allows the motor 141 to rotate, for example, in the other direction, the nut block 143 may move upward along the screw rod 142. Here, the support shaft 144 mounted on the nut block 143 may move upward, and the separator winding roll 121 mounted on the support shaft 144 may move upward to increase in supply height.

Thus, the separator tension adjustment unit 140 may adjust a rotation direction and rotation rate of the motor 141 and allow the separator winding roll 121 to move in a vertical direction H, thereby adjusting the supply height of the separator 14.

As a result, the supply height of the separator 14 may be adjusted through the separator tension adjustment unit 140 to minimize or prevent an occurrence of wrinkles on the separator 14 when the stack table 110 moves left and right.

The tension meter 130 may measure the tension at the separator 14 disposed between the stack table 110 and the separator winding roll 121. Here, the tension meter 130 may be provided on the support roll 122 of the separator supply unit 120.

Also, the tension meter 130 may measure force applied to the support roll 122 by the separator 14 to measure a tension value of the separator 14 when the separator 14 is zigzag-folded on the stack table 110 while the separator 14 passes between the pair of support rolls 122.

Furthermore, the tension meter 130 may be provided as, for example, a dancer position sensor. (The dancer position sensor may use a DSP-P1 manufactured by Montalvo and attach a synchro transmitter to a dancer roll (support roll) to convert a displacement amount from a movement center position into an electrical signal, thereby outputting the converted signal so as to measure tension.)

Referring to FIGS. 1, 4, and 6, the control unit 150 may control the separator tension adjustment unit 140 according to the tension value of the separator 14, which is measured by the tension meter 130, to adjust the tension of the separator 14.

Also, the control unit 150 may determine the tension value of the separator 14 to be measured at time intervals of 0.01 seconds or less to adjust the rotation rate of the motor 141 of the separator tension adjustment unit 140, thereby adjusting the supply height of the separator winding roll 121.

Here, the control unit 150 may adjust the rotation rate of the motor 141 in one direction and the rotation rate of the motor 141 in the other direction in the separator tension adjustment unit 140 to allow the separator winding roll 121 to move, thereby adjusting the supply height of the separator 14.

Furthermore, the control unit 150 may comprise a memory (not shown) in which a tension reference value is stored. Thus, the control unit 150 may compare the tension reference value stored in the memory to the tension value measured by the tension meter 130 to control the separator tension adjustment unit 140, thereby adjusting the supply height of the separator 14.

Here, for example, the control unit 150 may allow the separator winding roll 121 to move upward when the tension value of the separator 14 is less than the tension reference value stored in the memory and allow the separator winding roll 121 to move downward when the tension value of the separator 14 is greater than the tension reference value stored in the memory.

Thus, the control unit 150 may measure the tension of the separator 14 through the tension meter 130 to adjust the supply height of the separator 14 through the separator tension adjustment unit 140 so that the separator 14 has constant tension when the separator 14 is stacked on the stack table 110, to maintain the separator in a straight section L1. As a result, referring to FIGS. 1 and 6, the control unit 150 may control the separator tension adjustment unit 140 at time intervals of 0.01 seconds or less so as to prevent a wrinkle occurrence section L2 from occurring due to a change in tension of the separator 14 and also constantly maintain the tension of the separator 14 when the stack table 110 moves left and right, thereby significantly minimizing dispersion of wetting property and air permeability of the electrode assembly 10.

Referring to FIGS. 1 and 6, the fixing jig 160 may press the electrode 13 and the separator 14 whenever the electrode 13 and the separator 14 are stacked on the stack table 110 to fix the electrode 13 and the separator 14 to the stack table 110.

In addition, the fixing jig 160 may press a top surface of the first electrode 11 stacked at the uppermost side of the stack table 110 when the first electrode 11 is stacked on the stack table 110 and press a top surface of the second electrode 12 stacked at the uppermost side of the stack table 110 when the second electrode 12 is stacked on the stack table 110.

Furthermore, the fixing jig 160 may be provided with four pieces to press four corner portions of each of the first electrode 11 and the second electrode 12.

Also, the fixing jig 160 may comprise first jigs 161 and 162 pressing one sides of the first electrode 11 and the second electrode 12 or second jigs 163 and 164 pressing the other sides of the first electrode 11 and the second electrode 12. Here, the first jigs 161 and 162 and the second jigs 163 and 164 may alternately press the first electrode 11 and the second electrode 12 when the first electrode 11 and the second electrode 12 are stacked.

Referring to FIGS. 1 and 2, a first electrode supply unit 170 may supply the first electrode 11 to the stack table 110.

In addition, the first electrode supply unit 170 may further comprise a first electrode roll 171 around which the first electrode 11 is wound in a sheet shape, a first cutter 172 that cuts the first electrode 11 at a predetermined interval to from a first electrode 11 having a predetermined size when the first electrode 11 wound around the first electrode roll 171 in the sheet shape is unwound, a first conveyer belt 173 allowing the first electrode 11 cut by the first cutter 172 to move, and a first electrode supply head 174 that vacuum-absorbs the first electrode 11 transferred by the first conveyer belt 173 to stack the first electrode 11 on the stack table 110. Here, the first cutter 172 may cut the first electrode 11 having the sheet shape so that a first electrode tab 11a protrudes from an end of the first electrode 11 when the first electrode 11 is cut.

A second electrode supply unit 180 may supply the second electrode 12 to the stack table 110.

In addition, the second electrode supply unit 180 may further comprise a second electrode roll 181 around which the second electrode 12 is wound in a sheet shape, a second cutter 182 that cuts the second electrode 12 at a predetermined interval to from a second electrode 12 having a predetermined size when the second electrode 12 wound around the second electrode roll 181 in the sheet shape is unwound, a second conveyer belt 183 allowing the second electrode 12 cut by the second cutter 182 to move, and a second electrode supply head 184 that vacuum-absorbs the second electrode 12 transferred by the second conveyer belt 183 to stack the second electrode 12 on the stack table 110. Here, the second cutter 182 may cut the second electrode 12 having the sheet shape so that a second electrode tab 12a protrudes from an end of the second electrode 12 when the second electrode 12 is cut.

Hereinafter, an operation of the apparatus 100 for manufacturing the electrode assembly according to an embodiment of the present invention will be described.

Referring to FIGS. 1 and 6, the separator 14 wound around the separator winding roll 121 may be unwound to pass between the pair of separator support rolls 122 and then be supplied to the stack table 110. Then, the stack table 110 may move left and right to fold the separator 14 in the zigzag shape. Also, when the stack table 110 moves left and right, the first electrode 11 and the second electrode 12, which are supplied from the first electrode supply unit 170 and the second electrode supply unit 180 are stacked between the folded separators 14.

In more detail, referring to FIGS. 1 and 2, when the stack table 110 moves to a left side, the first electrode 11 is supplied from the first electrode supply unit 170 to the stack table 110 so as to be stacked, and then, the fixing jig 160 may press the first electrode 11 to be fixed to the stack table 110. Thereafter, when the stack table 110 moves to a right side, the separator 14 wound around the separator winding roll 121 is unwound to be disposed on an upper portion of the first electrode 11 stacked on the stack table 110, and then, when the second electrode 12 is supplied from the second electrode supply unit 180 to the stack table 110 and is stacked so that the first electrode 11 and the second electrode 12 are disposed between the separators 14, the fixing jig 160 may press the second electrode 12 to be fixed to the stack table 110. Thereafter, the stack table 110 may move alternately left and right, and the separator 14 may be folded in the zigzag shape so that the first electrode 11 and the second electrode 12 are disposed between the folded separators 14 to manufacture the electrode assembly 10.

Here, when the stack table 110 moves left and right, the tension meter 130 may measure the tension of the separator 14 disposed between the separator winding roll 121 and the stack table 110, and the separator tension adjustment unit 140 may adjust the supply height of the separator 14 while the separator winding roll 121 vertically moves according to the measured tension value. Therefore, the supply height of the separator 14 may be adjusted to constantly adjust the tension of the separator 14.

Hereinafter, an apparatus for manufacturing an electrode assembly according to another embodiment of the present invention will be described.

Figure 7:
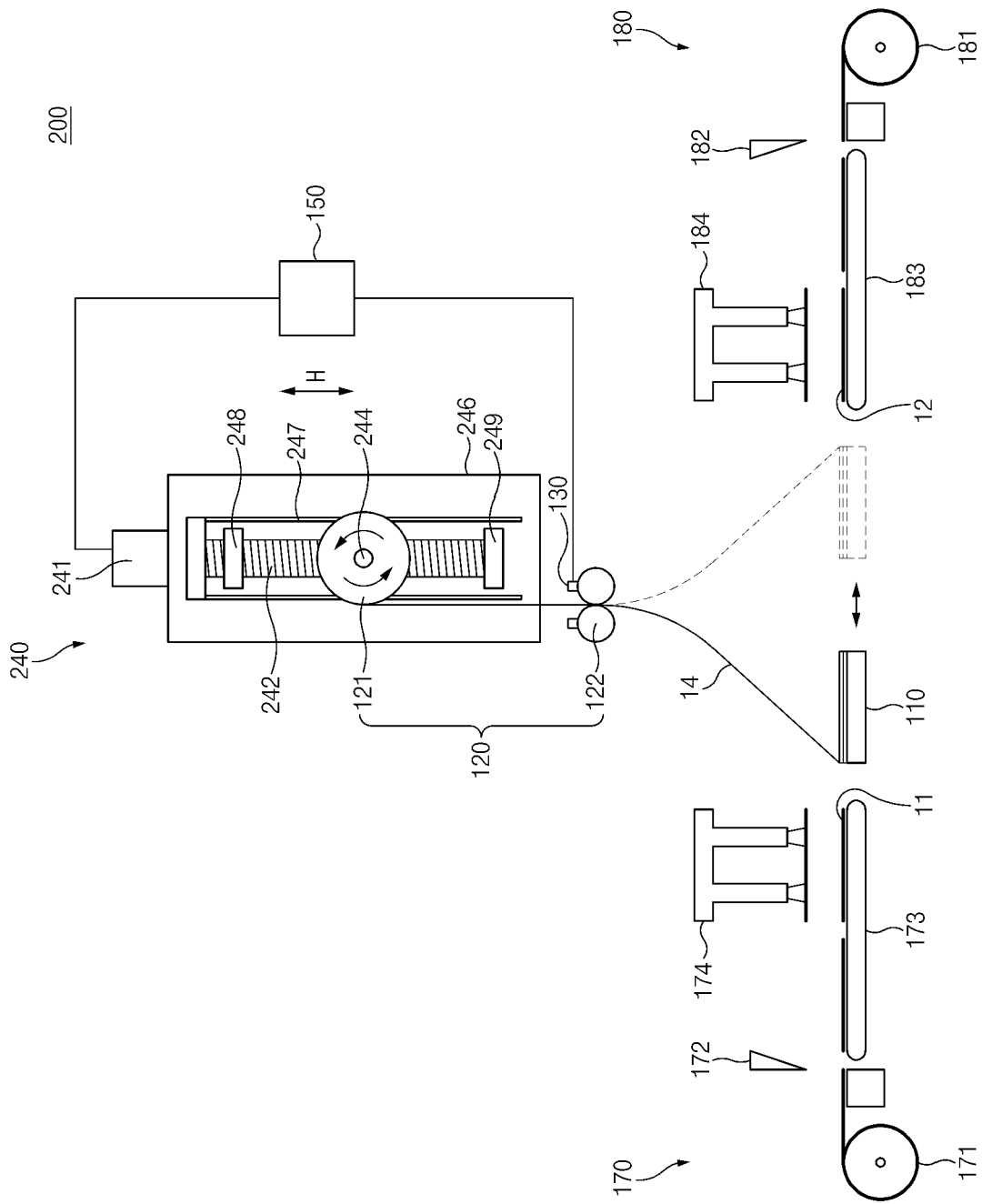
FIG. 7 is a front view exemplarily illustrating an apparatus for manufacturing an electrode assembly according to another embodiment of the present invention.

FIG. 7 is a front view exemplarily illustrating an apparatus for manufacturing an electrode assembly according to another embodiment of the present invention.

Referring to FIG. 7, an apparatus 200 for manufacturing an electrode assembly according to another embodiment of the present invention is an apparatus for manufacturing an electrode assembly 10 by alternately stacking an electrode 13 and a separator 14 on a stack table 110 and comprises a separator supply unit 120 supplying the separator 14 to the stack table 110, a separator tension adjustment unit 240 constantly adjusting tension of the separator 14 supplied to the stack table 110, a tension meter 130 measuring the tension of the separator 14, a control unit 150 controlling the separator tension adjustment unit 240, and a fixing jig 160 fixing the electrode 13 and the separator 14 to the stack table 110. (see FIG. 6)

When the apparatus 200 for manufacturing the electrode assembly according to another embodiment of the present invention is compared to the apparatus 100 for manufacturing the electrode assembly according to the foregoing embodiment of the present invention, this embodiment is different from the foregoing embodiment in configuration of the separator tension adjustment unit 240. Thus, contents of this embodiment, which are duplicated with those according to the forgoing embodiment, will be briefly described, and also, differences therebetween will be mainly described.

Figure 8:
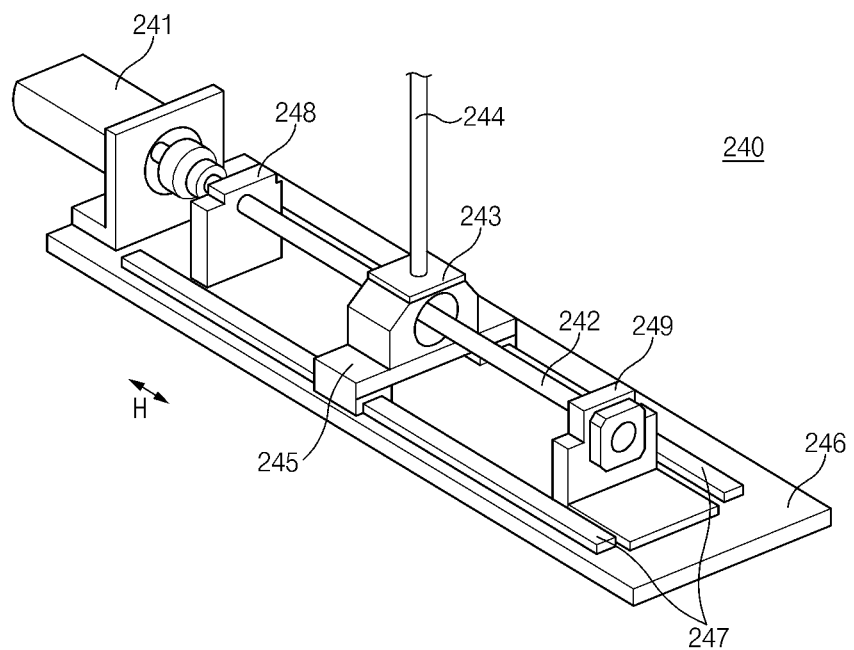
FIG. 8 is a perspective view illustrating a separator tension adjustment unit in the apparatus for manufacturing the electrode assembly according to another embodiment of the present invention.

FIG. 8 is a perspective view illustrating a separator tension adjustment unit in the apparatus for manufacturing the electrode assembly according to another embodiment of the present invention.

In more detail, referring to FIGS. 7 and 8, in the apparatus 200 for manufacturing the electrode assembly according to another embodiment of the present invention, the separator tension adjustment unit 240 may constantly adjust the tension of the separator 14 supplied to the stack table 110. Here, the separator tension adjustment unit 240 may adjust a supply height of a separator winding roll 121 to adjust the tension of the separator 14.

Also, the separator tension adjustment unit 240 may comprise a support shaft 244 on which the separator winding roll 121 is mounted, a nut block 243 having one side on which the support shaft 244 is mounted and having an inner circumferential surface in which a screw hole is formed, a screw rod 242 having an outer circumferential surface on which a screw part is formed to be screw-coupled to the screw hole of the nut block 243, and a motor 241 allowing the screw rod 242 to rotate. Here, the motor 241 may be provided as, for example, a servo motor or a step motor.

Furthermore, the separator tension adjustment unit 240 may further comprise a base 246, a guide rail 247 provided on one surface of the base 246, a block guide part 245 which is slidably coupled to the guide rail 247 and to which the other side of a nut block 243 is fixed, and first and second support parts 248 and 249 fixed to the base 246 to rotatably support upper and lower sides of a screw rod 242.

The base 246 may provide a support body on which the respective parts of the separator tension adjustment unit 240 are supported.

The guide rail 247 may be provided in a pair to be fixed one surface of the base 246 in a direction parallel to each other. Here, the guide rail 247 may be disposed parallel to the screw rod 242.

The block guide 245 may be guided by the guide rail 247 to move vertically along an outer surface of the guide rail 247.

The first support part 248 may rotatably support the upper portion of the screw rod 242, and the second support part 249 may rotatably support the lower portion of the screw rod 242.

As a result, the apparatus 200 for manufacturing the electrode assembly according to the other embodiment of the present invention may further comprise the base 246, the guide rail 247, and the block guide part 245 to allow the support shaft 244 on which the separator winding roll 121 is mounted to more precisely move vertically through the nut block 243. That is, when the nut block 243 on which the support shaft 244 is mounted move vertically along the screw rod 242, the nut block 243 may move along the guide rail 247 through the block guide part, and when the screw rod 242 rotates, the nut block 243 may be prevented from rotating and be constantly maintained in vertical movement amount. Thus, the separator tension adjustment unit 240 may stably adjust a supply height of the separator winding roll 121 to more constantly maintain the tension of the separator 14.

Hereinafter, an electrode assembly according to an embodiment of the present invention will be described.

Referring to FIG. 3, an electrode assembly according to an embodiment of the present invention may be the electrode assembly manufactured through each of the apparatus for manufacturing the electrode assembly according to the foregoing embodiment and the apparatus for manufacturing the electrode assembly according to another embodiment.

Thus, in this embodiment, contents duplicated with those of the apparatus for manufacturing the electrode assembly according to the foregoing embodiment and the apparatus for manufacturing the electrode assembly according to another embodiment will be omitted.

An electrode assembly 10 may be a power generation element that is chargeable/dischargeable and have a shape in which a first electrode 11, a separator 14, and a second electrode 12 are alternately stacked to be combined with each other.

Hereinafter, a secondary battery according to an embodiment of the present invention will be described.

Figure 9:
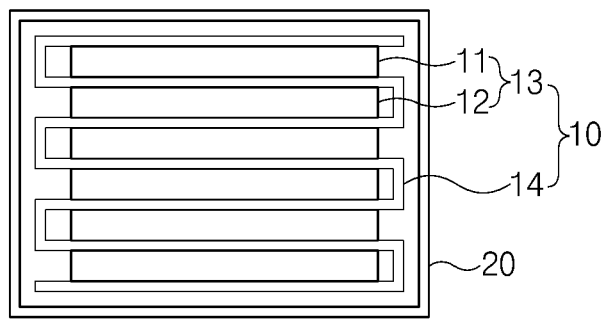
FIG. 9 is a cross-sectional view of a secondary battery according to an embodiment of the present invention.

FIG. 9 is a cross-sectional view of a secondary battery according to an embodiment of the present invention.

Referring to FIG. 9, a secondary battery 1 according to an embodiment of the present invention comprises an electrode assembly 10 and a battery case 20 accommodating the electrode assembly 10.

The secondary battery according to an embodiment of the present invention may be the secondary battery 1 manufactured through each of the apparatus for manufacturing the electrode assembly according to the foregoing embodiment and the apparatus for manufacturing the electrode assembly according to another embodiment. Thus, in this embodiment, contents duplicated with those of the apparatus for manufacturing the electrode assembly according to the foregoing embodiment and the apparatus for manufacturing the electrode assembly according to another embodiment will be omitted or briefly described, and also, only differences therebetween will be described.

In more detail, the electrode assembly 10 may be the electrode assembly manufactured through the apparatus for manufacturing the electrode assembly according to the foregoing embodiment. Thus, an electrode 13 and a separator 14 may be alternately stacked, and the separator 14 may be folded in a zigzag shape so that the electrode 13 is disposed between the folded separators 14.

Here, the electrode 13 may comprise a first electrode 11 and a second electrode 12, and thus, the first electrode 11 and the second electrode 12 may be alternately disposed between the folded separators 14.

A battery case 20 may comprise an accommodation part in which the electrode assembly 10 is accommodated.

While the present invention has been particularly shown and described with reference to exemplary embodiments thereof, it is to be understood that the scope of the present invention is not limited to the apparatus for the electrode assembly according to the present invention, the electrode assembly manufactured therethrough, and the secondary battery. It will be understood by those of ordinary skill in the art that various changes in form and details may be made therein without departing from the spirit and scope of the invention.

Furthermore, the scope of protection of the present invention will be clarified by the appended claims.

The invention claimed is:

1. An apparatus for manufacturing an electrode assembly, in which an electrode and a separator are alternately stacked, and the separator is folded in a zigzag shape so that the electrode is disposed between the folded separator to manufacture the electrode assembly, the apparatus comprising:
   a stack table;
   a separator supplier configured to supply the separator to the stack table; and
   a separator tension adjuster configured to adjust tension of the separator supplied to the stack table,
   wherein the separator supplier comprises a separator winding roll around which the separator is wound, and
   wherein the separator tension adjuster is configured to adjust a supply height of the separator winding roll to adjust the tension of the separator.

2. The apparatus of claim 1, further comprising a fixing jig configured to press the electrode and the separator whenever the electrode and the separator are stacked on the stack table to fix the electrode and the separator to the stack table.

3. The apparatus of claim 1, further comprising a tension meter configured to measure tension of a portion of the separator, the tension meter being disposed between the stack table and the separator winding roll.

4. The apparatus of claim 3, further comprising a controller configured to control the separator tension adjuster according to a tension value of the separator, which is measured by the tension meter, to adjust the tension of the separator.

5. The apparatus of claim 3, wherein the separator supplier further comprises a support roll configured to support the separator that is unwound from the separator winding roll to move to the stack table, and wherein the tension meter is provided on the support roll.

6. The apparatus of claim 5, wherein the support roll is provided in a pair to support opposite surfaces of the separator, wherein the tension meter is configured to measure force applied to the pair of support rolls by the separator to measure a tension value of the separator when the separator passes between the pair of support rolls so as to be zigzag-folded on the stack table.

7. The apparatus of claim 6, wherein the stack table is configured to move left and right to fold the separator in the zigzag shape, and wherein the pair of support rolls are disposed parallel to each other in a left and right direction so as to be spaced a predetermined distance above the stack table.

8. The apparatus of claim 1, wherein the separator tension adjuster comprises a support shaft, on which the separator winding roll is mounted, to adjust the tension of the separator while the support shaft moves.

9. The apparatus of claim 8, wherein the separator tension adjustment adjuster comprises:

a nut block having a first side on which the support shaft is mounted and having an inner circumferential surface in which a screw hole is formed;

a screw rod having an outer circumferential surface on which a screw part is formed to be screw-coupled to the screw hole of the nut block; and a motor configured to allow the screw rod to rotate, wherein, the screw rod is configured to rotate by the motor, and the nut block linearly is configured to move along the screw rod to allow the support shaft to move vertically.

10. The apparatus of claim 9, further comprising:

a tension meter configured to measure tension of a portion of the separator, the tension meter disposed between the stack table and the separator winding roll; and a controller configured to adjust the tension of the separator through the separator tension adjuster according to a tension value of the separator, which is measured by the tension meter, wherein the controller is configured to determine the tension value of the separator at time intervals of 0.01 seconds or less to adjust a rotation rate of the motor of the separator tension adjuster, thereby adjusting the supply height of the separator winding roll.

11. The apparatus of claim 9, wherein the separator tension adjuster further comprises:

a base;

a guide rail provided on one surface of the base; and a block guide part which is slidably coupled to the guide rail and to which a second side of the nut block is fixed.

12. The apparatus of claim 11, wherein the separator tension adjuster further comprises;

a screw rod; and first and second support parts fixed to the base to rotatably support upper and lower sides of the screw rod, respectively.

* * * * *